(12) United States Patent
Butler (10) Patent No.: US 6,752,937 B2
(45) Date of Patent: Jun. 22, 2004

(54) HIGHLY CONDUCTIVE MOLDING COMPOUNDS HAVING AN INCREASED DISTRIBUTION OF LARGE SIZE GRAPHITE PARTICLES

(75) Inventor: Kurt I. Butler, Kingsville, OH (US)

(73) Assignee: Quantum Composites, Inc., Bay City, MI (US)

( * ) Notice: Subject to any disclaimer, the term of this patent is extended or adjusted under 35 U.S.C. 154(b) by 242 days.

(21) Appl. No.: 10/135,955

(22) Filed: Apr. 29, 2002

(65) Prior Publication Data

US 2003/0168638 A1 Sep. 11, 2003

Related U.S. Application Data

(60) Provisional application No. 60/341,337, filed on Dec. 17, 2001.

(51) Int. Cl.[7] .............................. H01B 1/20; H01B 1/21; H01M 8/00
(52) U.S. Cl. ........................ 252/511; 252/512; 252/513; 264/105; 429/30; 429/32; 429/34; 204/254; 204/295
(58) Field of Search ................................. 252/511, 512, 252/513; 264/104, 105; 429/32, 34, 30; 204/254, 295

(56) References Cited

U.S. PATENT DOCUMENTS

| | | | |
|---|---|---|---|
| 4,197,178 A | 4/1980 | Pellegri et al. |
| 4,301,222 A | 11/1981 | Emanuelson et al. |
| 4,339,322 A | 7/1982 | Balko et al. |
| 4,587,160 A | 5/1986 | Williams et al. |
| 4,908,157 A | 3/1990 | Fontana et al. |
| 5,108,849 A | 4/1992 | Watkins et al. |
| 5,230,966 A | 7/1993 | Voss et al. |
| 5,250,228 A | 10/1993 | Baigrie et al. |
| 5,268,400 A | 12/1993 | Iseler et al. |
| 5,342,554 A | 8/1994 | McBain et al. |
| 5,516,546 A | 5/1996 | Hari et al. |
| 5,614,581 A | 3/1997 | Cobbledick et al. |
| 5,686,199 A | 11/1997 | Cavalca et al. |

(List continued on next page.)

FOREIGN PATENT DOCUMENTS

| | | |
|---|---|---|
| EP | 0 470 510 A | 2/1992 |
| JP | 57 178732 | 11/1982 |
| JP | 06 264104 | 9/1994 |
| WO | WO 00/25372 | 5/2000 |
| WO | WO 00/57500 | 9/2000 |
| WO | WO 00/57506 | 9/2000 |

OTHER PUBLICATIONS

Hankdbook of Plastic Materials and Technology. Edited by Irvin I. Rubin, Robinson Plastics Corporation. Copyright 1990 by John Wiley & Sons, Inc., p. 679, Line 54.17 Low Profile Additives.

(List continued on next page.)

*Primary Examiner*—Mark Kopec
(74) *Attorney, Agent, or Firm*—Hudak, Shunk & Farine Co. LPA; Laura F. Shunk (57) ABSTRACT

The invention provides a resin matrix with high loadings of a conductive filler; various additional additives, such as initiators, mold-release agents, shrink control additives, and carbon black; and optionally one or more rheological agents selected from the group comprising group II oxides, alkaline earth oxides, carbodiamides, polyisocynates, polyethylene and polytetraethylene fluoroethylene. The conductive filler is an inorganic filler which is desirably particulate graphite having a significant distribution of large particles such as for example, 95% in the range of about 150 to about 1000 microns with over about 40%, and more particularly about 50% or even 60% over 200 microns, or over 300 microns, or even over 600 microns. Conductive polymers may be used as a conductivity enhancer with the graphite. In addition, silver coated ceramic fibers can be added to improve the overall electrical properties. Fuel cell plates can be made from these compositions. Fuel cell plates can be made from these compositions.

20 Claims, 3 Drawing Sheets

U.S. PATENT DOCUMENTS

| | | | |
|---|---|---|---|
| 5,744,816 | A | 4/1998 | Butler |
| 5,854,317 | A | 12/1998 | Rinz |
| 5,942,347 | A | 8/1999 | Koncar et al. |
| 5,998,510 | A | 12/1999 | Butler |
| 6,007,933 | A | 12/1999 | Jones |
| 6,251,308 | B1 * | 6/2001 | Butler ................. 252/511 |
| 6,436,315 | B2 * | 8/2002 | Butler ................. 252/511 |
| 2001/0049046 | A1 | 12/2001 | Butler |

OTHER PUBLICATIONS

Krauss Maffei Plastics Machinery Technology, Polyset/Duroset Injection Moulding Machines for Polyester BMC SMS. Thermosets and HTV Silicones, pp. 1–7, no date.

Website p. 1 of 1: article entitled "Our Products"; Composite Polyester Resins Compression Molding SMC/BMC; STYPOL Shrinkage Control Additives, no date.

Copy of Article entitled "Unsaturated Polyester Technology", Edited by Paul F. Bruins, Polytecchnic Institute of New York, Brooklyn, no date.

Copy of Article entitled Sheet Molding Compounds Science and Technology, Edited by Hamid G. Kia, Hanser/Gardner Publications, Inc. Cincinnati, pp. 50–78, no date.

Database WPI, Derwent Publications, Ltd., London, GB; XP002186236 & SU 1 666 308 A (Karpov, V. Ya), Jul. 30, 1991 abstract.

Chanda, Manas et al.: "Plastics Technology Handbook", 1998, Marcel Dekker Inc., NY XP002186235, p. 186, p. 188, p. 199, p. 201.

* cited by examiner

HIGHLY CONDUCTIVE MOLDING COMPOUNDS HAVING AN INCREASED DISTRIBUTION OF LARGE SIZE GRAPHITE PARTICLES

This patent application is based upon U.S. Provisional Application Ser. No. 60/341,337, filed Dec. 17, 2001.

FIELD OF INVENTION

The field of invention is highly conductive compositions that are particularly suitable for intricately molded conductive products including fuel cell plates. These compounds can be used in molding processes such as injection, compression, transfer, and injection/compression molding.

Products molded from the composition of this invention desirably have a bulk conductivity of at least 70, and up to 170 or more S/cm. They also have desirable surface characteristics; heat, temperature, chemical and shrink resistance; strength; and cost. The compositions include a thermoset resin matrix such as a polyester or vinyl ester with a high loading of conductive inorganic filler, typically graphite having a particular particle size distribution wherein a significant portion of the particles exceed 75 microns, 100, 150, 200, 300 and even exceeding 500 or 600 microns. These conductivity values can be increased even more to better achieve through plane conductivity by the inclusion of conductive silver metal-coated ceramic fibers or other conductive additives.

The molding compositions in accordance with the invention can be formed into high definition complex configurations, including configurations, which are particularly suitable for a variety of molding techniques. Further labyrinthine plates can be made substantially exclusively by molding, meaning that the need for complex and expensive machining processes is virtually eliminated. Thin plate-like specimens (e.g. 60 to 200 thousandths of an inch) having an intricately patterned network of very narrow, relatively smooth, flow passages can be made by molding these compositions. Such specimens are used as electrochemical cell bipolar plates.

BACKGROUND OF THE INVENTION

Conductive polymeric compositions have applications in providing alternatives to traditional conductive materials, which often involve greater labor expense to manufacture into complex parts. In particular, in instances where the demand justifies significant volumes of a product, polymer-molding expenses may prove far more cost effective than comparable machining expenses for other materials. However in the past, it has proved difficult to achieve both a high level of conductivity and desirable molding characteristics. Generally, high-level weight percentages of an appropriate filler in a polymeric matrix are necessary to achieve satisfactory levels of conductivity. However, these high load levels lead to problems with the strength, durability, and moldability of the resulting composition One area in particular where it would be beneficial to solve the previously mentioned strength, durability, and molding issues is for application in fuel cells. Electrochemical fuel cells have great appeal as a potentially limitless energy source that is clean and environmentally friendly. These fuel cells can, in addition, be constructed at an appropriate scale for small-scale energy consumption, such as household use, or for industrial scale use, and even for commercial power generation. They have portable applications to power small appliances (such as computers or camping equipment), or automobiles and other forms of transportation. Although these different applications involve differences in size, the fundamental construction remains the same for generation of power varying from less than one to a few thousand kilowatts.

Basically, a fuel cell is a galvanic cell in which the chemical energy of a fuel is converted directly into electrical energy by means of an electrochemical process. The fundamental components of the fuel cell are an electrode comprising an anode and a cathode, eletrocatalysts, and an electrolyte. Work has been done in perfecting both liquid and solid electrolyte fuel cells and the present invention may find use in both types of fuel cells.

Solid electrolytes include polymeric membranes, which act as proton exchange membranes typically fueled by hydrogen. These membranes usually comprise a perfluorinated sulphonic acid polymer membrane sandwiched between two catalyzed electrodes that may utilize platinum supported on carbon as an electrocatalyst. Hydrogen fuel cells form a reaction chamber, which consumes hydrogen at the anode. At the cathode, oxygen reacts with protons and electrons at the electrocatalytic sites yielding water as the reaction product. A three-phase interface is formed in the region of the electrode and a delicate balance must be maintained between the electrode, the electrolyte, and the gaseous phases.

Systems involving the use of other electrolytes have been also been studied. These would include alkaline fuel cells, phosphoric acid fuel cells, molten carbonate fuel cells, and solid oxide fuel cells. However, the principles are similar, as are some of the issues in perfecting these products.

A fuel cell reactor may comprise a single-cell or a multi-cell stack. In any case, the cell includes at least two highly conductive flow field plates that serve multiple functions. These plates may function as current collectors that provide electrical continuity between the fuel cell voltage terminals and electrodes. They also provide mechanical support (for example for the membrane/electrode assembly). In addition, these plates act to transport reactants to the electrodes and are essential to establishing the previously mentioned delicate phase balance.

Typically, the fuel cell plates are thin relatively flat plate members that include a highly complex network of interconnecting channels that form the flow field area of the plate. The configuration of these channels is highly developed in order to maintain the proper flow of reactants and to avoid channeling or the formation of stagnant areas, which results in poor fuel cell performance. It is critical that the flow of the reactants is properly managed, and that the electrocatalysts are continuously supplied with precisely the appropriate balance of reactants. Thus, it is essential for the plates to define and maintain clear passages within the highly engineered flow labyrinth. Moreover, in order to assure a satisfactory life, the plates must be able to resist surface corrosion under a variety of conditions. For example, fuel cells may be placed outside and subject to ambient weather. Thus, the cells must be resistant to stress cracking and corrosion at temperature ranging from −40 to 200 degrees Fahrenheit. Further, since the conditions within the cell are corrosive, the cells must also be resistant to chemical attack at these temperatures from various corrosive substances. For example, the plates may be subjected to de-ionized water, methanol, formic acid, formaldehyde, heavy naptha, hydrofluoric acid, tertafluoroethylene, and hexafluoropropylene depending on the fuel cell type. Moreover, the conditions within the fuel cell may lead to elevated temperatures, i.e. from 150 to 200 degrees Fahrenheit, as well as elevated pressures, i.e. from ambient to 30 psi. Corrosive decomposition needs to be avoided since it almost certainly would cause a system failure by changing the flow patterns within the fuel cell.

Past attempts at solving the various requirements for fuel cell plates have included the use of metal and machined graphite plates. The use of metal plates result in higher weight per cell, higher machining costs and possibly corrosion problems. Machined graphite plates solve the weight and corrosion problems but involve high machining cost and result in fragile products, especially when prepared as very thin plates. Some use of graphite/poly(vinylidene fluoride) plates has been made but these have been characterized as being expensive and brittle and having long cycle times. U.S. Pat. No. 4,197,178 is incorporated herein for its teaching of the working and compositions of electrochemical cells. U.S. Pat. No. 4,301,222 is incorporated herein for its teachings on graphite-based separators for electrochemical cells.

SUMMARY OF THE INVENTION

In the past, known conventional bulk molding compounds have been modified to be conductive by the addition of large amounts of conductive filler, such as graphite. During molding it was observed that the liquid resin phase separated from the filler and was exuded from the molding. Further, it was observed that this occurrence tended to cause cracking in molded specimens that were thin. Moreover, bulk conductivity measurements at different locations within the specimen were inconsistent. These and other problems lead to difficulties in molding highly intricate configurations. Accordingly, it was discovered that compositions could be formulated which solved the foregoing issues.

In particular, the formulations involve the use of a resin matrix with high loadings of a conductive filler; various additional additives, such as initiators, mold-release agents, shrink control additives, and carbon black; and optionally one or more rheological agents selected from the group comprising group II oxides, alkaline earth oxides, carbodiamides, polyisocynates, polyethylene and polytetraethylene fluoroethylene. The conductive filler is an inorganic filler which is desirably particulate graphite having a significant distribution of large particles such as for example, 95% in the range of about 150 to about 1000 microns with over about 40%, and more particularly about 50% or even 60% over 200 microns, or over 300 microns, or even over 600 microns. Conductive polymers may be used as a conductivity enhancer with the graphite. In addition, silver coated ceramic fibers can be added to improve the overall electrical properties. Fuel cell plates can be made from these compositions.

In addition to solving molding and cracking problems it is anticipated that other properties such as the coefficient of thermal expansion, electrical and thermal conductivity, shrink resistance and mechanical properties may be more uniform and/or otherwise improved as a result of the use of the present invention.

The foregoing improvements in specimens molded from these compositions enable the low cost mass production of bipolar plates as an additional embodiment of the invention. These could be used for portable fuel cells, as well as stationary power units.

DETAILED DESCRIPTION OF THE INVENTION

The invention relates to improvements to the surface and through plane conductivity of conductive molding compositions. In particular, the compositions can be used in injection molding processes, in transfer molding, in compression molding processes, and in injection/compression molding processes. These processes are cost effective because they eliminate labor intensive machining, and because of repeatability with respect to shot to shot. The processes further have better ability to control shot to shot cross parting line thickness. Further these molding processes enable the production of thin and intricate specimens that have high concentrations of conductive filler.

Sheet molding and bulk molding compositions are described in U.S. Pat. Nos. 5,998,510; 5,342,554; 5,854,317; 5,744,816; and 5,268,400; all of which are hereby incorporated by reference for their teachings on the various modifications to molding compositions that are known to the art.

One component of the molding resin composition is a cross linkable prepolymer such as an unsaturated polyester resin or vinyl ester resin. Desirably the prepolymer has a relatively low molecular weight such as from about 200 to about 5000 (weight average). They are described in detail with examples in the above patents incorporated by reference. The polyester resins are the condensation product derived from the condensation of unsaturated polybasic acids and/or anhydrides with polyols such as dihydroxy or trihydroxy compounds. Desirably, these polyester resins are the esterification reaction product of diacids, or anhydrides of diacids, generally having from about 3 to about 12, or more preferably from about 4 to about 8 carbon atoms, with a polyol or a cyclic ether having from about 2 to about 12, or more preferably from about 2 to about 6 carbon atoms.

In general, the vinyl ester resins that can be used are the reaction products of epoxy resins and a monofunctional ethlenically unsaturated carboxylic acid. More specifically, these vinyl ester resins are the reaction product of an epoxy terminated oligomer, for example, an epoxy functionalized bisphenol A with an acrylic acid, or methacrylic acid forming acrylic terminal groups on the oligomer. The vinyl esters have predominantly terminal unsaturation while the unsaturated polyesters have predominantly internal unsaturation.

Another component of the molding composition is one or more unsaturated monomer that is copolymerizable with the resin. Desirably, this component is capable of dissolving the resin component at room temperature. Thus, in one embodiment the resin is dissolved in the monomeric component prior to being combined with the remaining components. Examples of suitable monomers are styrene, alpha-methyl styrene, chloro-styrene, vinyl toluene, divinyl benzene, diallylphthalate, methyl methacrylate, and mixture of these, with preferred monomers being styrene and methyl methacrylate. The ratio of monomer(s) to resin is desirably from about 40:60 to about 75:25 and preferably from about 40:60 to about 65:35 by weight.

Another component to the molding composition is fillers. In accordance with the invention the predominant filler is a conductive filler in order to impart electrical conductivity of the final molded product. A preferred filler is graphite particles with a particular particle size distribution. Suitable graphite particles include both natural and synthetic graphite. The desired distribution of large particles is, for example, 95% in the range of about 150 to about 1000 microns with over about 40%, and more preferably about 50% or even more preferably 60% over 200 microns, or even over 600 microns. A more preferred distribution includes over about 40%, and more preferably over about 50%, and more preferably over about 60% over 300 microns. Particles are typically measured in microns at some diameter, or also by mesh size wherein a suitable mesh here is typically at smaller than about 60 mesh. In addition, silver coated ceramic fibers can be added to improve the overall electrical properties.

In particular, a synthetic crystalline graphite particle, such as currently supplied by Asbury Graphite in Asbury, N.J. under the designations Asbury 4172 and 4811. This first graphite is characterized as having 55% at 50 mesh (297 microns), 22% at 60 mesh (250 microns), 16% at 70 mesh (210 microns), and 6% at 80 mesh (177 microns). The second graphite is characterized as having 36% at 100 mesh (149 microns), 45% at 200 mesh (74 microns), 12% at 325 mesh (44 microns), and 8% at −325 mesh (the negative sign denotes particles smaller than the designated mesh). Other graphites are sold by applied Carbon of New Jersey under the trademark K100 and K112. The first is characterized as having 0.7 at 40 mesh (420 microns), 22% at 50 mesh (297 microns), 22% at 60 mesh (250 microns), 19% at 70 mesh (210 microns), 16% at 80 mesh (177 microns), 17% at 100 mesh (149 microns), and 2% at 200 mesh (74 microns). The second is characterized in having 0.5% at 40 mesh (420 microns), 18% at 50 mesh (297 microns), 15% at 60 mesh (250 microns), 12% at 70 mesh (210 microns), 9% at 80 mesh (177 microns), 9% at 100 mesh (149 microns), 23% at 200 mesh (74 microns), 9% at 325 mesh (44 microns) and 5% at −325 mesh (where the negative size indicates that the particulate is smaller than this mesh). Other graphite fillers might be used in addition to the preferred graphites, and include: Ashbury A99, Ashbury 3243, Ashbury modified 4012, Ashbury 3285, Ashbury 230U; TimrexR KS 75 and 150, and TimrexR KC 44, all sold by TIMCAL of Westlake, Ohio; and Calgraph Sold by SGL Technic Inc of Valencia, Calif. This filler is used at a loading of at least 50% by weight. Other conductive fillers such as other forms of graphite (including graphite pitch-based fibers), conductive polymer metal particles, or metal coat particles may be used in conjunction with the graphite filler. Desirably conductive fillers are at least about 50, about 60, or about 65 weight percent of the molding composition. More desirably the filler is more than about 70 or 75 percent to about 80 weight percent of the molding composition. Alternatively this amount can be expressed as at least about 250 phr, more preferably at least about 275, or 300 phr or even over 500 phr. Alternatively stated the conductive fillers are present in an effective amount to result in a bulk conductivity of at least about 40, about 50, about 60, about 70, about 80, about 85, about 90 or about 96 S/cm when measured in accordance with ASTM Test Standard No. F1529-97 for a molded article having a thickness from about 0.060 to about 0.200 inches. Current technology in fuel cell plates uses a bulk conductivity of at least about 55 S/cm, and preferably at least about 70, 80, and even more. These values can be improved by the addition of conductive enhancers such as silver coated ceramic fibers, like Ag-Fiber sold by Energy Strategy Associates of Florida, or conductive polymers such as poly-paraphenyleneimine based products sold under the Tyrosid 1000 designation by J. H. Hinz Company of Westlake, Ohio.

An initiator is another component of the molding composition. The initiator initiates the copolymerization of the resin and the monomer(s). Initiators include any free radical initiator capable of forming radicals in the correct concentration under the molding conditions. They may include peroxides, hydroperoxides, redox systems, diazo compounds, persulfates, perbenzoates etc. The initiators are typically used in amounts of about 0.05 to about 5 weight percent, and more preferably about 0.1 to about 2 weight percent. Alternatively, these amount can be expressed in parts per hundred parts by weight of resin, i.e. from about 0.5 to about 4.0 phr, preferably from about 0.7 to about 3.0 phr, and most preferably from about 0.8 to about 2.25 phr. Alternatively high temperature initiators such as Di-cup, e.g. dicumyl peroxide can be used for molding applications where higher iniation temperatures are desirable. The inclusion of 0.5 to 10 phr, preferably about 1 to 8 phr, of a mold release agent, such as Tech-lube HV706, calcium stearate, zinc stearate, or the like may also be of advantage to achieving without machining the highly complex molded part of the present invention. Tech-lube HV706 is proprietary composition of fatty acids, glycerides, polymeric resin and phosphate surfactant sold by Tech-nick Products of New Jersey.

Another optional component to the improved molding composition is a rheological modifier, which may act to increase the molecular weight such as by chain extension of the resin prepolymer. Suitable modifiers include Group II oxides and hydroxides, such as calcium or magnesium oxide; carbodiamides; aziridines; and polyisocyanates. It is believed that the foregoing modifiers act chemically by co-reacting into the polymer backbone at carboxy or hydroxy sites. Other suitable modifiers include polytetrafluorethylene (PTFE); perfluoropolyether (PFPE), and polyethylene. These modifiers may act to reduce shear and thus promote flow in the composition during molding. Fumed silica is an example of a substance, which may act mechanically to increase molding viscosity and therefore be a suitable rheological modifier for this invention. Combinations of two or more rheological modifiers may be desirable for optimum properties. In this application they are used to modify the resin structure to prevent phase separation of the resin from the conductive filler (in particular in view of the high loadings of the conductive filler, i.e. over 50% or even 65% by weight or more of graphite) The modifiers are further used in general to enable the achievement of a high definition conductive polymeric fuel cell plate or other molded products.

Desirably the rheological modifiers are used in an effective amount to prevent phase separation during molding. For the purpose of this application molding will desirably be at pressures from about 400 to about 9000 psi, and preferably from about 2000 to about 3500 psi, and most preferably from about 2500 to about 3000 psi. Desirable amounts of group II oxides (including group II hydroxides and mixtures of these compounds) is from about 0.1 to about 1 or about 2 weight percent, more desirably from about 0.2 or about 0.3 to about 0.7 or about 0.8 weight percent. This can also be expressed as from about 0.5 to about 4.0 phr, preferably from about 1.0 to about 3.0 phr, and most preferably from about 1.5 to about 2.5 phr. Specific preferred compounds include magnesium oxide, or magnesium hydroxide or calcium oxide. Examples of a suitable magnesium oxide additives are 99% pure magnesium oxide sold under the trade name "Elastomag" from Morton Thiokol, Inc. in Danvers, Mass. Other examples include a magnesium oxide dispersion sold under the trade name "PG-9033" by Plasticolors, and a magnesium hydroxide dispersion also sold by Plasticolors under the trade name "PG-91146". Another suitable magnesium hydroxide is Barcroft, which is a powdered version. Examples of aziridine compounds include polyfunctional aziridines supplied by EIT, Inc. under the trade designation XAMA, including XAMA-2, which is identified as trimethylol propane-tris (beta-(N-aziridinyl) proprionate), and, in particular, XAMA-7, which is identified as pentaerythritol-tris-(beta-(aziridinyl)propioanate); a product of Sybron Chemicals, under the trade name Ionac including PFAZ-322, identified as a trifuncional aziridine; and including CX-100, a product of Zeneca Resins, identified as a polufunctional aziridine. Desirable amounts of aziridine and/or polyisocyanate modifiers is from about 1 to about 10 or about 15 weight percent, and more desirably from about 2 or about 3 to about 8 or about 9 weight percent. This can also be expressed as from about 0.5 to about 20 phr, preferably from about 1 to about 17 phr, and most preferably from about 2 to about 15 phr. Polyisocyanates in general are described in more detail in U.S. Pat. No. 5,268,400 column 6 lines 59 through column 7 line 17. A specific diisocyanate, which can be used is diphenylmethane diisocyanate such as that sold by ICI Americas of West Deptford, N.J., under the trade name "Rubinate R MF-1780. Additionally, a suitable diisocynate is Lupranate MP102, solvent free urethane-modified diphenylmethane diisocynate from BASF. Desirable amounts of polytetrafluorethylene (PTFE) (and/or perfluoropolyether (PFPE)) is from about 0.5 to about 1 or about 2 weight percent, more desirably from about 0.6 or about 0.7 to about 1.8 or about 1.3 weight percent. This can also be expressed as from about 0.5 to about 20 phr, preferably from about 3 to about 15 phr, and most preferably from about 5 to about 12 phr. A suitable fine particle PTFE powder (having an average particle size by Coulter Counter of less than 6 microns) is sold under the trade name "Marzon #5 by Marshall Products Company of West Chester Pa. It is preferable to use a linear low density polyethylene such as sold by Equistar of Houston Tex. under the trade name FN 510. It is preferable to use it in amounts of from about 3 to about 20 phr, more preferably from about 4 to about 17, and most preferably from about 5 to about 15 phr/Fumed silica could be used at from about 0.5 to about 20 phr, preferably from about 1 to 10 phr.

Other optional components to a molding composition include urethane based or urethane containing oligomers or polymers, low shrinkage additives like polyvinyl acetate or polyethylene; fibrous reinforcing agents such as cotton glass microfibers or graphite microfibers; flexibilizing agents; mold release agents; polymerization inhibitors to inhibit premature polymerization during storage or the initial stages of molding; viscosity modifiers like famed silica; and mold lubricant like stearates of calcium, zinc or magnesium. Carbon black may be added to influence the surface conductivity and to change the appearance of the molded product. Suitable carbon blacks include an electrically conductive low residue carbon black having a nitrogen surface area m2/g of 270, a STSA surface Area m2/g of 145 a sieve residue at 35 mesh of 0 ppm and at 325 mesh of 20 ppm as sold under the trade name Conductex 975 by Columbia Chemicals of Jamesburg, N.J. Also, suitable conductive carbon black is supplied by Akzo Nobel Chemicals of Chicago, Ill. under the trade name Ketjenblack EC-300 J and EC-600JD. Cabot Corporation of Boston Mass. and Applied Science of Cedarville, Ohio supply conductive carbon blacks. It is noted that polyethylene and fumed silica can function as the rheological modifier in addition to the foregoing functions.

In addition, shrink control additives can advantageously be added to improve the surface characteristics and the dimensional stability of the resulting products. These shrink control additives include "anti-shrink" and "low profile additives" as part of this aspect of the invention. These additives generally include thermoplastics or elastomerics such as homopolymers of ethylene, styrene, vinyl toluene, alkyl methacrylates, polyethylene ether, polyphenylene oxide and alkyl acrylates. Additional examples include copolymers using the foregoing and in addition, vinyl chloride, vinyl acetate, acrylonitrile, and butadiene. In particular these co-polymers would advantageously include copolymers of vinyl chloride and vinyl acetate; styrene and acrylonitrile; methyl methacrylate and alkyl esters of acrylic acid; methyl methacrylate and styrene; methyl methacrylate and acrylamide; and SBS block copolymers. These additives are generally used in the range of 10 to 50 weight percent based on the total weight of the additive and the resin system, i.e. the resin and any monomers. More preferably this range would be 20 to 45 weight percent, with a particularly preferred range of about 30 to 40 weight percent. These additives are usually added with the resin blending. As necessary the cure system may be adjusted to compensate for the presence of the additive.

The molding compositions may be formulated and mixed using a variety of mixing conditions including either continuous or batch and using a variety of known mixing equipment. Specific examples are set forth in the example section. The compositions may be advantageously stored for reasonable times before molding. The compositions can be molded by a variety of methods including compression, transfer, and injection molding or combinations of theses techniques. The compositions can be molded under typical conditions for these types of molding including at pressures from about 400 to about 9000 psi, and preferably from about 2000 to about 3500 psi, and most preferably from about 2500 to about 3000 psi and temperatures at from about 225 to about 400 degrees Fahrenheit. Dwell times are from about 10 seconds to about four minutes.

Otherwise conventional injection molding techniques apply as is discussed for example in U.S. Pat. No. 6,365,069 B2 incorporated by reference herein. It is more preferred that a double auger system is used with a first and larger horizontally oriented auger which feeds the smaller vertical auger feeding into a modified phenolic resin type screw in the feed throat which ports directly into a single or double gate cavity mold. The first auger is a standard style and size auger; however, the vertical auger is a 90 mm outer diameter and approximately 35 inch length auger. The tip of this auger was modified by matching and blending into the feed throat area to eliminate any dead spots. The otherwise standard smear tip of the phenolic screw is modified from standard by machining to a constant inner diameter and a constant flight depth which was blended to a point at the end. A phenolic screw differs from other known screw configurations by the flight range, as well as by the fact that a phenolic screw does not include check rings. Further, the process involves some zoned temperature gradients with a first and second zone in the first screw barrel each having a temperature, which can be the same or different, of from about 70 to about 140 degrees F., and more particularly about 70 to about 100 degrees F. (i.e. 70 F.). It is also possible to take this temperature lower by using a chiller. A third zone is located at the mold. This zone is maintained at about 275° to about 325° F., (i.e. 300° F.) which is the temperature at which cure is initiated for most of the compositions in accordance with the invention. The examples were run using the parenthetical temperatures. Current work involves holding the first and the second zone both at 70° F. Earlier work involved having the first zone at 90–95° F. and the second zone at 110–125° F. It is preferable to avoid temperature variations at the mold level. At normal cure rates, the mold time is typically around 5 to 600 seconds, or more usually 30 to 300 seconds or around one or two minutes. The process can be practiced for single or double gate cavity tools, or even for injection/compression processes in which the mold is slightly opened during fill and the mold is shut to compress the shot.

It was also found that the composition could be molded by injection molding using a single auger Krauss-Maffei AZ50 or AZ100 stuffer with porting directly into the feed throat of the injection molding machine. This machine has a angled rotating conical hopper with a rotating auger screw. The angle is between 30 and 60 degrees to the horizontal plane, and more particularly at about 45 degrees. Thus, this auger has a vertical component to its orientation. The stuffer needs to be sealed or semi-sealed to avoid drying of the compound. For injection molding, the present invention is preferably conveyed using a double auger to the feed throat of an injection molding apparatus. Alternatively, it has also been found that a single auger, such as is found in an injection molding machine sold by Krauss Maffei with an AZ100 stuffing unit and a 60 mm screw and barrel for thermoset BMC, can be used where the auger is disposed at a angle of between about 30 and 60 degrees to the horizontal plane of the feed throat. More particularly, the angle is about 45 degrees plus or minus 5 degrees. These processes together contrast to the traditional process using a hydraulic ram to port the molding composition to the feed throat. Further, this molding process involves some zoned temperature gradients with a first and second zone in the first screw barrel having a temperature of from about 70° to about 125° degrees F., and more particularly about 70° to about 100° F. A third zone is located at the mold. This zone is maintained at about 275° to about 325° (i.e. 300° F.) which is the temperature at which cure is initiated for most of the compositions in accordance with the invention. It is preferable to avoid temperature variations at the mold level. At normal cure rates, the mold time is typically around 5 to 600 seconds, or more usually 30 to 300 seconds or around one or two minutes. The process can be practiced for single or double gate cavity tools, or even for injection/compression processes in which the mold is slightly opened during fill and the mold is shut to compress the shot In addition, a round disc sample has been successfully molded using the L-23193 formulation using a Krauss-Maffei injection molding machine with the AZ100 stuffer system.

The compositions are useful for molding complex configurations including thin or intricate conductive articles such as those having a thickness from about 0.020 to about 0.200 inches, and more preferably from about 0.040 to about 0.150 inches. The compositions are useful for articles having bulk conductivity of at least 40, 50, 60, 70, 80, 85, 90 or even 96 S/cm at a thickness given above. The articles from the composition desirably have tensile strength from about 2000 to about 6000 psi as measured in accordance with ASTM test No.D638 and flexural modulus from about 3000 to about 10,000 psi when tested in accordance with ASTM test no. D790.

Figure 1:
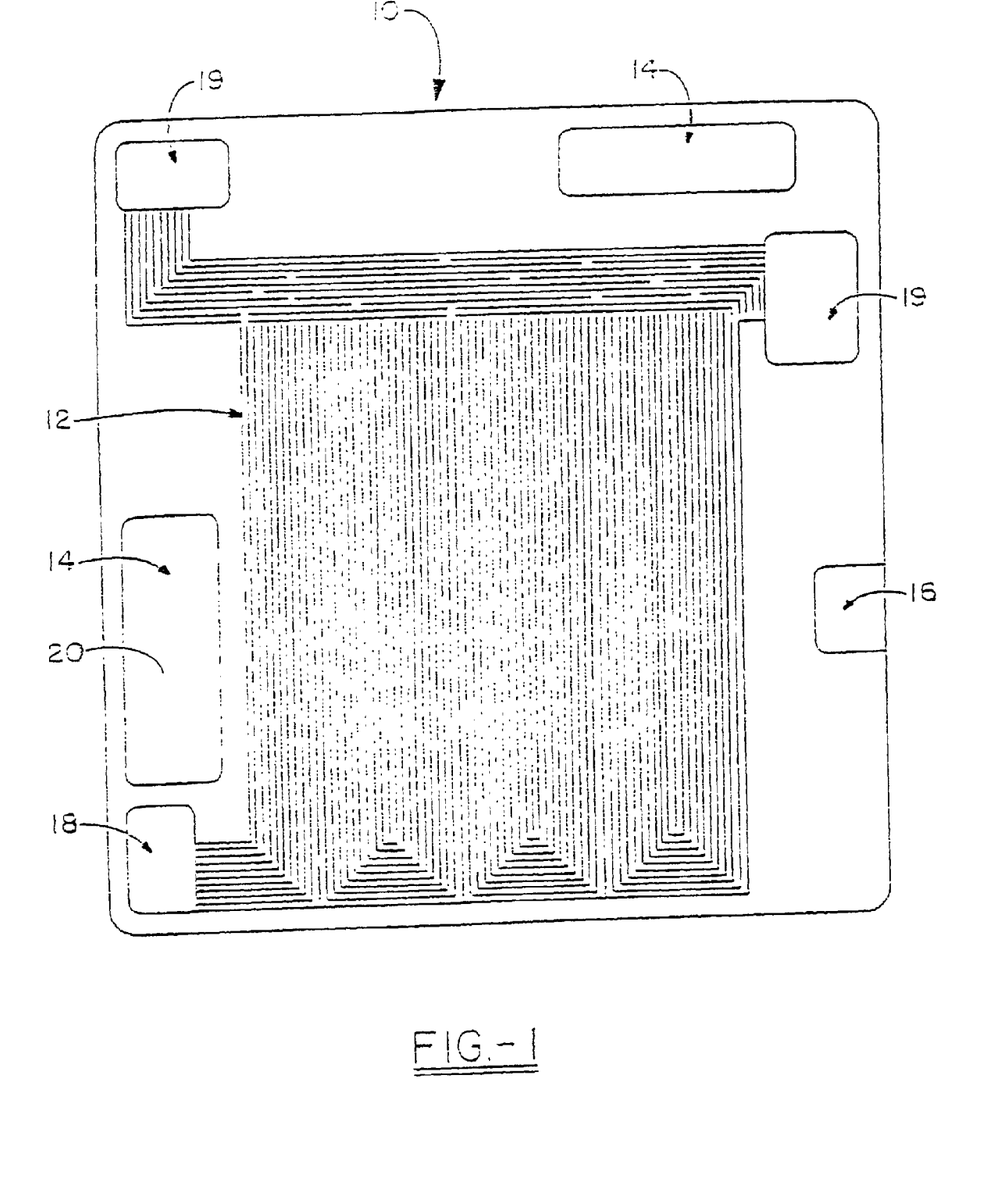
FIG. 1 is an illustration of a bipolar fuel cell plate that can be made in accordance with the present invention.

Molded products made from the compositions of the present invention are useful for a variety of applications demanding complex configurations, conductivity, as well as strength, and corrosion resistance. One particularly advantageous product, which can be made by compression molding, is a bipolar plate for use in fuel cells. An example of such a plate is shown in FIG. 1. The drawing of this plate is intended to illustrate the molding capabilities of the conductive compound of the present invention. It is not necessarily intended to provide optimal, or even operative, field flow design. It should not limit the invention in any way. The plate 10 includes a fluid flow face with one or more generally parallel and or serpentine flow channels 12. The flow channels receive and transmit fluids through ports 14 and 16, which are in fluid communication with corresponding entry and exit fluid manifolds 18 and 19. The plate has a dimension, which will vary from 1 to 20 inches in length and width, and having a thickness of 0.02 to 0.3 inch, with a cross-sectional depth of the flow channel in the range of about 0.005 to 0.080 inch. The cross-sectional width of a land separating adjacent flow channel sections is in the range of 0.01 to 0.1 inch. The plate may include a number of peripheral through holes that act as a manifold for fuel transportation. The plate made using the compositions of the present invention can be made substantially exclusively by molding operations. The intricate pattern can be established without the need for expensive, post plate production machining operations, such as drilling, or reaming or the like.

Figure 2:
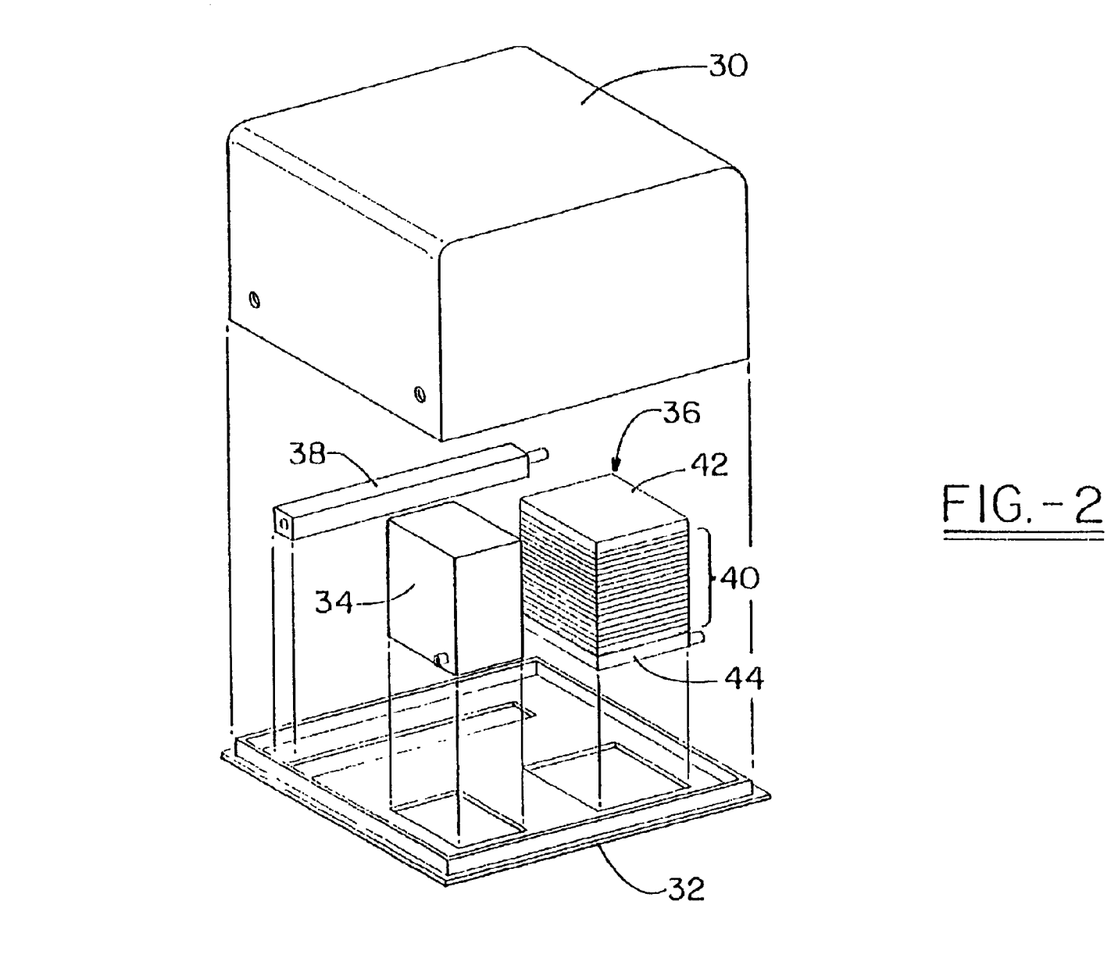
FIG. 2 is an illustration of a fuel cell assembly utilizing a bipolar cell plate.

FIG. 2 illustrates the unassembled components of a fuel cell. This fuel cell has a base unit 12, which includes debossed means to accept a reformer 14 and a fuel cell stack 16, which is comprised of a plurality of bipolar plates 20 which are sandwiched between a stack cap 22 and a stack base 24. The fuel cell further includes a heat exchanger 26. An enclosure 30 provides a leak-proof housing for the unit.

EXAMPLES

The following examples use the components set forth below.

Resin A is Hetron 922 available from Ashland Chemical Co in Columbus Ohio. It is a low viscosity epoxy vinyl ester resin. It is about 55 wt. % solids and about 45 wt. % reactive monomer.

Resin B is Atlac 382ES from Reichhold Chemicals, Inc. in Research Triangle Park, N.C. It is characterized as a bisphenol fumarate resin. It was diluted to about 55 wt. % solids with styrene.

Resin C is Dion 6694 diluted to 55 wt. % solids in styrene. It is available from Reichhold Chemicals, Inc. It is characterized as a modified bisphenol fumarate polyester.

Resin D is 42-2641 from Cook Composites and Polymers in Kansas City, Mo. It was diluted to 55 wt. % solids with styrene. It is characterized as an unsaturated polyester resin.

Resin E is ATLAC 3581-61 from Reichhold Chemicals, Inc. It is characterized as a vinyl ester resin at 19 wt %, polyester at 27 wt % and urethane polymer at 4 wt % combined with 50 wt % styrene. Thus, it was diluted to 50 wt % solids with styrene.

Resin F is 580-05 from Reichhold Chemicals, Inc. It is characterized as a urethane-modified vinyl ester resin. It was diluted to 54 wt % solids with styrene.

Resin G is 9100 from Reichhold Chemicals, Inc. It is characterized as a bisphenol-epoxy vinyl ester. It was diluted to 54–58 wt % solids with styrene.

Resin H is Dow Derakane R8084 from Dow Chemicals, Inc. It is characterized as an elastomer-modified vinyl ester resin. It was diluted to 50–60 wt % solids with styrene.

Resin I is 9480-00 from Reichhold Chemicals, Inc. It is characterized as an epoxy novolac vinyl ester. It was diluted to 53.5 wt % solids with styrene.

Resin J is 31632 from Reichhold Chemicals, Inc. It is characterized as a isocyanurate vinyl ester resin with 4 wt % polyether polyol. It was diluted to 60 wt % solids with styrene.

Resin K is Dow Derakane 797 from Dow Chemicals, Inc. It is characterized as a one pack resin which is an epoxy vinyl ester resin containing 7–13 weight percent of divinyl benzene, 5–15 weight percent of styrene butadiene rubber co-polymer, 2–6 weight percent of styrene homopolymer, and 0.5 to 1.5 weight percent of styrene-ethylene oxide block copolymer, as a low profile additive. It was diluted to 60–65 wt % solids with styrene.

Resin L is Dow Derakane 790 from Dow Chemicals, Inc. It is also characterized as a one pack resin which is an epoxy vinyl ester resin containing 5-15 weight percent of styrene butadiene rubber co-polymer, 2–6 weight percent of styrene homopolymer, and 0.5 to 1.5 weight percent of styrene-ethylene oxide block copolymer, as a low profile additive. It was diluted to 50–60 wt % solids with styrene.

Resin M is 31633-00 from Reichhold Chemicals, Inc. It is characterized as a isocyanurate vinyl ester resin with 4 wt % polyether polyol. It was diluted to 60 wt % solids with styrene.

Resin N is Dow Derakane 780 from Dow Chemicals, Inc. It is also characterized as a vinyl ester resin. It was diluted to 60–70 wt % solids with styrene.

Resin O is Polylite from Reichhold Chemicals, Inc.

Resin P is Altac-G380 from Reichhold Chemicals, Inc.

Resin Q is Dow Derakane 790 from Dow Chemicals, Inc.

Monomer A is styrene.

Monomer B is Divinylbenzene HP from the Dow Chemical Company and characterized as 80 wt % divinyl benzene, 18 wt % ethylvinylbenzene, less than 0.12 wt % p-tert butylcatechol, less than 0.5 wt % diethylbenzene and less than 1 wt % of Naphthalene.

Rheological Modifier A is Elastomag from Morton Thiokol. Inc. in Danvers, Mass. It is characterized as 99% pure magnesium oxide.

Rheological Modifier B is a polyisocyanate. The material used in these experiments is 40-7263 from Cook Composites and Polymers. It is characterized by a NCO content of 17.7 to 20.9, a viscosity of 110–170, a flash point of 87° F., and a crystallization point of 40° F.

Rheological Modifier C is RCI RD THL55 (also known as RD-1070) from Reichhold, Inc. It is specifically a polyurethane resin.

Rheological Modifier D is Rubinate 1780 available from ICI. It is characterized as a polymeric methylene diphenyl diisocyanate.

Rheological Modifier E is Marzon #5 from Marshall Products Company of West Chester, Pa. It is characterized as a finely divided powder polytetrafluorethylene.

Rheological Modifier F is FN-510, a linear low-density polyethylene from Equistar Chemicals, L.P. of Houston, Tex.

Rheological Modifier G is Cab-o-sil silica

Initiator A is Vazo (2,2-azo bisisobutyronitrile) available from Dupont, I & B Industrial and Biochemical Dept, Wilmington Del.

Initiator B is tert-butyl peroxy isopropyl carbonate (Triginox BPIC) available from Durr Marketing in Pittsburgh, Pa.

Initiator C is t-butylperbenzoate (TBPB) available from Durr Marketing.

Initiator D is 1,3 di-t-butyl peroxy-3,5,5 trimethylcyclohexane catalyst (Trig 29B75) available from Durr Marketing.

Mold release agent A is calcium stearate.

Mold release agent B is zinc stearate sold as COAD 27 by the Norac Company, Incorporated of Azusa, Calif.

Mold release agent C is BYK-W9050.

Mold release agent D is Tech-Lube HV-706, which is a proprietary composition of fatty acids, glycerides, polymeric resin and phosphate surfactant.

Graphite A is graphite 4012 available from Asbury Graphite in Asbury, N.J. It is characterized by having less than 10% greater than 150 microns and less than 10% smaller than 44 microns in diameter.

Graphite B is SGL Ash02 characterized as a natural graphite flake product sold by SGL Corporation.

Graphite C is XC-72.SGLV Fine characterized as a natural graphite flake product sold by SGL Corporation.

Graphite D is available from Asbury Graphite in Asbury, N.J. It is a modified version of the 4012 product.

Graphite E is a conductive flake graphite available from Asbury Graphite in Asbury, N.J. under the trade designation 3243. It is characterized by having less than 18% greater than 75 microns and less than 65% smaller than 44 microns in diameter.

Graphite F is a conductive flake graphite available from Asbury Graphite in Asbury, N.J. under the trade designation 230U. It is characterized by having 100% smaller than 44 microns in diameter.

Graphite G is a synthetic graphite available from Asbury Graphite in Asbury, N.J. under the trade designation A99. It is characterized by having less than 3% greater than 44 microns and less than 99% smaller than 44 microns in diameter.

Graphite H is a synthetic graphite available under the designation KS 75, from Timrex America, Inc. It is characterized by having less than 95% greater than 96 microns and less than 95% smaller than 75 microns in diameter.

Graphite I is a synthetic graphite available under the designation KS 150, from Timrex America, Inc. It is characterized by having at least 95% less than 180 microns in diameter.

Graphite J is a synthetic graphite available under the designation KC44, from Timrex America, Inc. It is characterized by having at least 90% less than 48 microns in diameter.

Graphite K is a graphite available under the designation Timrex KS5-75TT from TimCal Ltd. of Bodio, Switzerland. It is characterized as having a particle distribution with d10 of 9.1 $\mu$m, a d50 of 38.8 $\mu$m, and a d90 of 70 $\mu$m, as determined by laser diffraction (Malvern).

Graphite L is a synthetic graphite available under the designation of K103 from Applied Carbon Technology. It has a particle size distribution characterized as 1.0% max at +80 mesh, 10.% max at 100 mesh and 10.0% max at −325 mesh.

Graphite M is a graphite available under the designation Graphco from Asbury Graphite Mills. It has a particle size distribution characterized as 0.34% at +30 mesh, 58.9% at +50 mesh, 25.2% at +60 mesh, 10.9% at +80 mesh, and 5.7% at −80 mesh.

Graphite N is a graphite available under the designation Graphite Sales FP143 or ElCarbo100 from Graphite Sales of Nova, Ohio. It has a particle size distribution characterized as 5% at 2 mm, 30% at 0.8 mm, 50% at 0.2 mm, and 10% at pan.

Graphite O is a graphite available under the designation Asbury T SO333 from Asbury Graphite Mills. It is characterized as having a particle distribution of 0.17% at screen 100; 54.90% at screen 200; 30.5% at screen 325, and a pan of 14.43%.

Graphite P is a graphite available under the designation Asbury 4461 from Asbury Graphite Mills. It is characterized as having a particle distribution of 0.05% at +60 mesh; 35.52% of +100 mesh; 44.82% at +200 mesh; 11.77% at +325 mesh, and 7.9% at −325 mesh.

Graphite Q is graphite available under the designation Asbury 3285 from Asbury Graphite Mills. It is characterized as having a particle distribution of 0.05% at +100 mesh; 10.46% at +200 mesh; 29.22% at +325 mesh, and 60.32% at −325 mesh.

Graphite R is a graphite available under the designation Asbury 4592 from Asbury Graphite Mills. It is characterized as having a particle distribution of 0.02% at +60 mesh; 0.04% at +80 mesh; 0.78% at +100 mesh; 96.12% at +200 mesh; 1.3% at +325 mesh, and 1.74% at −325 mesh.

Graphite S is a graphite available under the designation Asbury 4172 from Asbury Graphite Mills. It is characterized as having a particle distribution of 0.34% at +30 mesh; 54.87% at +50 mesh; 21.52% at +60 mesh; 16.19% at +70 mesh; 5.7% at +80 mesh; 1.38% at −80 mesh, and 1.45% at −200 mesh.

Graphite T is a graphite available under the designation Asbury 4811 from Asbury Graphite Mills. It is characterized as having a particle distribution of 0.05% at +60 mesh; 35.52% at +100 mesh; 44.82% at +200 mesh; 11.77% at +325 mesh, and 7.9% at −325 mesh.

Graphite U is a synthetic graphite available under the designation K100 from Applied Carbon Technology of Sommerville, N.J. It is characterized as having a typical particle distribution of 0.18% at +30 mesh; 0.51–0.69% at +40 mesh; 22.16–24.98% at +50 mesh; 19.51%–22.17% at +60 mesh; 17.98%–19.77% at +70 mesh; 15.05%–15.84% at +80 mesh; 14.04%–17.84% at +100 mesh; 3.38%–5.62% at +200 mesh; 0.03% at +325 mesh, and 0.15%–0.50% at −325 mesh.

Graphite V is a graphite available under the designation K112 from Applied Carbon Technology. It is characterized as having a typical particle distribution of 0.14% at +30 mesh; 0.48% at +40 mesh; 17.62% at +50 mesh; 14.53% at +60 mesh; 12.05% at +70 mesh; 9.47% at +80 mesh; 8.89% at +100 mesh; 23.12% at +200 mesh; 8.87% +325 mesh, and 4.83% at −325 mesh.

Graphite W is a graphite available under the designation Asbury 4580 from Asbury Graphite Mills. It is characterized as having a typical particle distribution of 0.05% at +10 mesh; 11.92% at +20 mesh; 62.33% at +30 mesh, and 25.64 at −30 mesh.

Carbon Black A is a conductive carbon black nano fiber supplied under the trade name Pyrograph Applied Sciences, Inc. of Cedarville, Ohio.

Carbon Black B is characterized as an electrically conductive low residue carbon black having a nitrogen surface area m2/g of 270, a STSA surface Area m2/g of 145 a sieve residue at 35 mesh of 0 ppm and at 325 mesh of 20 ppm as sold under the trade name Conductex 975 by Columbia Chemicals of Jamesburg, N.J.

Carbon Black C is conductive carbon black supplied by Cabot Corporation of Boston, Mass. under the trade name, Black Pearls, while Graphite D is supplied by this company under the designation XC-72.

Carbon Black E is conductive carbon black supplied by Akzo Nobel Chemicals of Chicago, Ill. under the trade name Ketjenblack EC-300 J and EC-600JD. EC-300 J has an iodine absorption of 740–840 mg/g; a pore volume of 310–345 cm3/100 g and an apparent bulk density of 125–145 kg/m3. EC-600 JD has an iodine absorption of 1000–1150 mg/g; a pore volume of 480–510 cm3/100 g and an apparent bulk density of 100–120 kg/m3.

The Glass fibers were from Owens-Corning Fiberglass and are characterized as continuous glass filaments hammer milled into a specific length used as a reinforcing and filler medium.

The inhibitor was 2,6-di-tertbutyl-p-cresol (25% in vinyl toluene).

Low profile or anti-shrink additive A is FN-510, a linear low-density polyethylene from Equistar Chemicals, L.P. of Houston, Tex.

Low profile additive B is SGP-70C from Esprit Chemical of Sarasota, Fla. It is characterized as a styrene divinyl benzene copolymer with 0.4 wt % styrene monomer and 0.1 wt % divinyl benzene.

Low profile additive C is R-134 from Premix, Inc of North Kingsville, Ohio. It is characterized as a styrene and thermoplastic solution with 70–80 wt % resin and styrene monomer, and 20–30 wt % styrene butadiene styrene and styrene ethylene propylene copolymer.

Low profile additive D is Resin RP-700 from Owens-Corning Fiberglas. It is characterized as a styrene solution of polymethyl methacrylate with 30–35 wt % resin, and styrene.

Low profile additive E is Neulon polyester modifier T-plus from Union Carbide. It is characterized as a polyvinyl acetate/ester epoxide with less than 4 wt % acetate, greater than 5 wt % ester, epoxide, greater than 20 wt % polyvinyl acetate copolymer, and less than 60 wt % styrene.

Low profile additive F is Microthene F from Equistar Chemicals, L.P. of Houston, Tex. It is characterized as a microfine polypropylene powder having an average particle size of 20 microns.

Low profile additive G is Levapren 450 from Bayer Corporation. It is characterized as an ethylene-vinyl acetate copolymer in styrene.

Low profile additive H is XLP-1889 from Union Carbide. It is characterized as an acetic acid ethenyl ester, homopolymer in styrene with 0.5 wt % ketone, 0.5 wt % vinyl acetate, greater than 10 wt % ether ester, less than 34 wt % polyvinyl acetate and greater than 55 wt % styrene.

Low profile additive I is Neulon conductive E from Union Carbide. It is characterized as a carbon black/vinyl resin compound with greater than 70 wt % of carboxyl modified vinyl resin, less than 30 wt % of carbon black, less than 2 wt % vinyl acetate, and less than 1.5 wt % ketone.

Low profile additive J is RCI 31703, (Polylite R) from Reichhold, Inc. It is characterized as a urethane pre-polymer having 75 wt % polymer solids and 25 wt % styrene monomer.

Low profile additive K is PPO MX5587 from GE Plastics Canada, Ltd. It is characterized as a capped PPO resin which is a modified polyphenylene ether resin.

Low profile additive L is PPO SA120 from GE Plastics Canada, Ltd. It is characterized as a PPO resin which is a polyphenylene ether resin.

The Examples include the use of three additional additives. Conductive polymer A is a conductive polymer based on poly-paraphenyleneimine sold under the designation Tyrosid 1000 by Integrated Chemical Concepts, Inc. of Brecksville, Ohio. Fiber G is a conductive silver coated inorganic synthetic ceramic-like fiber comprised mainly of silicates of calcium, magnesium, and aluminum and sold under the designation Ag-Fiber by Energy Strategy Associates, Inc. of Palm Beach, Fla. Fiber H is a conductive carbon nanofiber with a typical diameter of 0.05 to 0.2 μm, and a length estimated between 50–100 microns. It is sold under the designation Pyrograf 111 by Pyrograf Products, a subsidiary of Applied Sciences, Inc.

The molding compositions are generally prepared by adding the resin, monomer, initiator, inhibitor, mold release agent, and rheological modifier (if present) to a high shear cowls disperser and blending for 2 minutes. The conductive filler is added to the mix in a Baker Perkin, or Littleford continuous mixer and mixed 10 to 15 minutes. A Readco mixer can also be used and the ingredients can be ported in separately or added at the same time under cowls. When mixing is complete the composition is put in a suitable barrier bag and allowed to mature for approximately one day before molding.

The molding parameters for the molding compositions are as follows: Molding temperature for plaques was 200° F. up to 370° F. with a molding time of 3 minutes down to 108 seconds depending on the initiator and a charge weight of 173 g. The molding temperature for prototype bipolar plates was 310° F. with a molding time of about 50 seconds and a charge weight of 300 g. These plates were highly detailed including an elaborate flow maze having about a 10 to 40 thousandth depth and corresponding width as typified in FIG. 1.

It was observed that the use of specific thermosetting resins with a conductive filler in combination with various rheological additives (thickeners) improved the bipolar plate composition in regards to having a product which can be used in mass production of electrochemical, e.g. fuel cell bipolar plates.

The results of the formulation changes include non-cracking molding compound, better hot strength out of the mold, lower production costs, shorter cycle times, better overall electrical conductivity, increased mechanical properties, and better rheological characteristics.

Table I sets forth recipes of compositions in accordance with the present invention which were tested for molding into fuel cell plates. Conductivity results are set forth in Table II.

Figure 3:
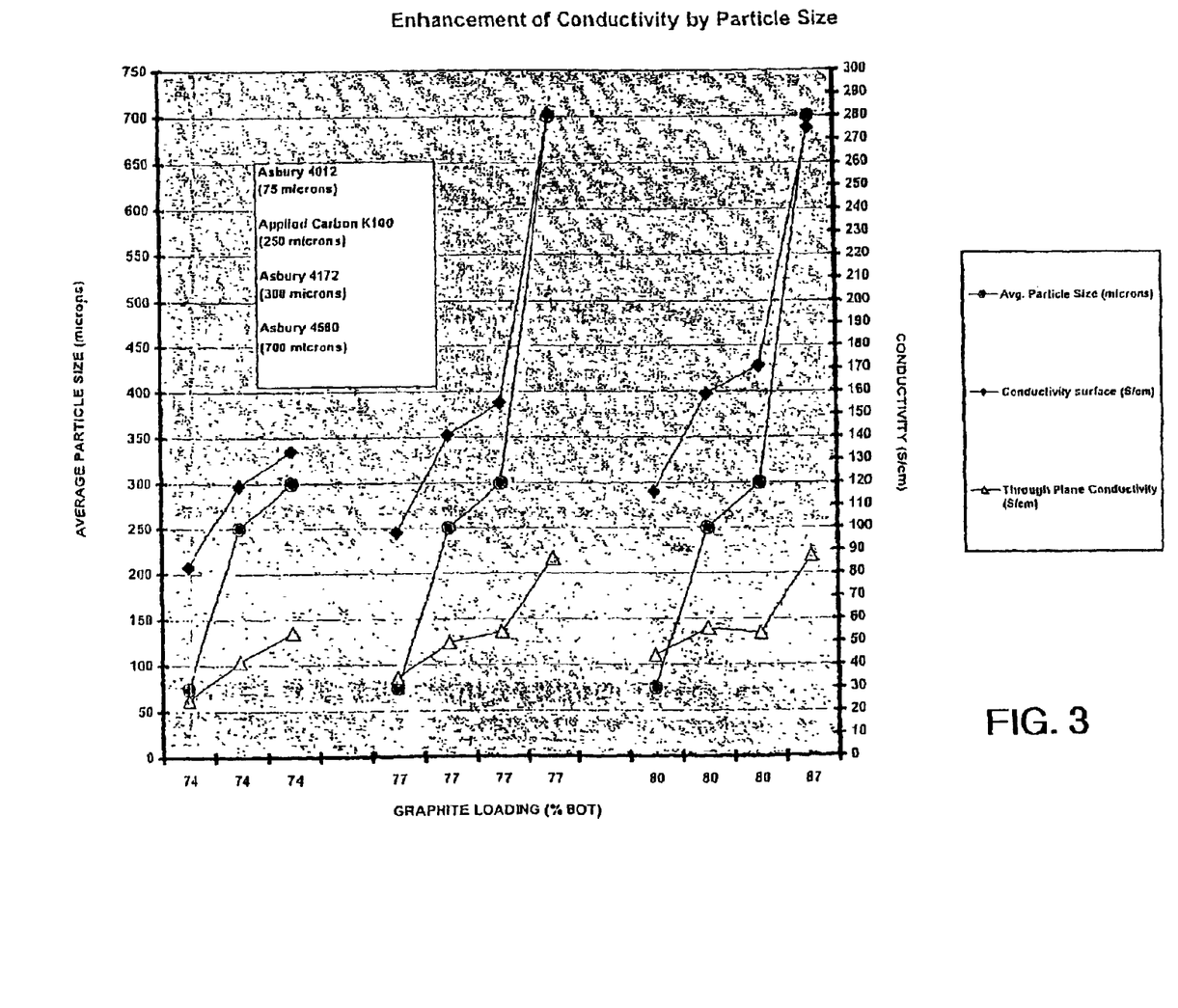
FIG. 3 is a plot of Enhancement of Conductivity by Particle Size

FIG. 3 is a graph which shows average particle size (microns) and conductivity comparisons (S/cm) for surface and through plane conductivity. The resin system was held constant and the loadings of graphite were varied using graphite with an average particle size of 75, 250, 300 and 700 microns. The correlations to improvements in conductivity at 74%, 77% and 80% loading are striking with a significant improvement at an average particle size of 700 microns.

While in accordance with the Patent Statutes, the best mode and preferred embodiment have been set forth, the scope of the invention is not limited thereto, but rather by the scope of the attached claims.

|  |  | L-24547 % BOT | L-24547 phr | L-24548 % BOT | L-24548 phr | L-24549 % BOT | L-24549 phr | L-24550 % BOT | L-24550 phr |
|---|---|---|---|---|---|---|---|---|---|
| 042-2641 | RESIN D | 19.63 | 100 | 19.63 | 100 | 19.63 | 100 | 19.63 | 100 |
| RCI 31633 (ITP-1094) | RESIN N | | | | | | | | |
| DOW SD-780 | RESIN Q | | | | | | | | |
| DIVINYLBENZENE (DVB-HP) | Monomer B | | | | | | | | |
| BPIC | INITIATOR B | 0.2 | 1.02 | 0.2 | 1.02 | 0.2 | 1.02 | 0.2 | 1.02 |
| 29B75 | INITIATOR D | | | | | | | | |
| 91029 | INHIBITOR | 0.1 | 0.51 | 0.1 | 0.51 | 0.1 | 0.51 | 0.1 | 0.51 |
| FN-510 | Shrink Additive A | 1.25 | 6.37 | 1.25 | 6.37 | 1.25 | 6.37 | 1.25 | 6.37 |
| CAST | RELEASE AGENT A | 1.2 | 6.11 | 1.2 | 6.11 | 1.2 | 6.11 | 1.2 | 6.11 |
| Tech Lube HV-706 | RELEASE AGENT D | | | | | | | | |
| ASBURY 4172 | GRAPHITE S | 74 | 376.97 | | | | | | |
| ASBURY 4811 | GRAPHITE T | | | 74 | 376.97 | | | | |
| APPLIED CARBON K-100 | GRAPHITE U | | | | | 74 | 376.97 | | |
| APPLIED CARBON K-112 | GRAPHITE V | | | | | | | 74 | 376.97 |
| ASUBURY 4580 | GRAPHITE W | | | | | | | | |
| ICCI TYROSID 1000 | CONDUCTIVE POLYMER A | | | | | | | | |
| 7263 | Rheological Modifier B | 3.62 | 18.44 | 3.62 | 18.44 | 3.62 | 18.44 | 3.62 | 18.44 |
| Rubinate 1780 | Rheological Modifier D | | | | | | | | |
| Silver Coated Cer. Fibers | FIBER G | | | | | | | | |
| APPLIED SCIENCE PYROGRAF | FIBER H | | | | | | | | |

-continued

|  |  | L-23913 % BOT | L-23913 phr | L-24208 % BOT | L-24208 phr | L-24608 % BOT | L-24608 phr | L-24612 % BOT | L-24612 phr |
|---|---|---|---|---|---|---|---|---|---|
| 042-2641 | RESIN D | 19.63 | 100 | 17.1 | 100 | 17.1 | 100 | 17.1 | 100 |
| RCI 31633 (ITP-1094) | RESIN N |  |  |  |  |  |  |  |  |
| DOW SD-780 | RESIN Q |  |  |  |  |  |  |  |  |
| DIVINYLBENZENE (DVB-HP) | Monomer B |  |  |  |  |  |  |  |  |
| BPIC | INITIATOR B | 0.2 | 1.02 | 0.2 | 1.17 | 0.2 | 1.17 | 0.2 | 1.17 |
| 29B75 | INITIATOR D |  |  |  |  |  |  |  |  |
| 91029 | INHIBITOR | 0.1 | 0.51 | 0.1 | 0.58 | 0.1 | 0.58 | 0.1 | 0.58 |
| FN-510 | Shrink Additive A | 1.25 | 6.37 | 1.25 | 7.31 | 1.25 | 7.31 | 1.25 | 7.31 |
| CAST | RELEASE AGENT A | 1.2 | 6.11 | 1.2 | 7.01 | 1.2 | 7.01 | 1.2 | 7.01 |
| Tech-Lube HV-706 | RELEASE AGENT D |  |  |  |  |  |  |  |  |
| ASBURY 4172 | GRAPHITE S |  |  |  |  | 77 | 450.29 |  |  |
| ASBURY 4811 | GRAPHITE T |  |  |  |  |  |  | 77 | 450.29 |
| APPLIED CARBON K-100 | GRAPHITE U |  |  |  |  |  |  |  |  |
| APPLIED CARBON K-112 | GRAPHITE V |  |  |  |  |  |  |  |  |
| ASUBURY 4580 | GRAPHITE W |  |  |  |  |  |  |  |  |
| ASBURY 4012 | GRAPHITE A | 74 | 377 | 79 | 450 |  |  |  |  |
| ICCI TYROSID 1000 | CONDUCTIVE POLYMER A |  |  |  |  |  |  |  |  |
| 7263 | Rheological Modifier B | 3.62 | 18.44 | 3.15 | 18.42 | 3.15 | 18.42 | 3.15 | 18.42 |
| Rubinate 1780 | Rheological Modifier D |  |  |  |  |  |  |  |  |
| Silver Coated Cer. Fibers | FIBER G |  |  |  |  |  |  |  |  |
| APPLIED SCIENCE PYROGRAF | FIBER H |  |  |  |  |  |  |  |  |

|  |  | L-24614 % BOT | L-24614 phr | L-24616 % BOT | L-24616 phr | L-24209 % BOT | L-24209 phr | L-24609 % BOT | L-24609 phr |
|---|---|---|---|---|---|---|---|---|---|
| 042-2641 | RESIN D | 17.1 | 100 | 17.1 | 100 | 14.55 | 100 | 14.55 | 100 |
| RCI 31633 (ITP-1094) | RESIN N |  |  |  |  |  |  |  |  |
| DOW SD-780 | RESIN Q |  |  |  |  |  |  |  |  |
| DIVINYLBENZENE (DVB-HP) | Monomer B |  |  |  |  |  |  |  |  |
| BPIC | INITIATOR B | 0.2 | 1.17 | 0.2 | 1.17 | 0.2 | 1.37 | 0.2 | 1.37 |
| 29B75 | INITIATOR D |  |  |  |  |  |  |  |  |
| 91029 | INHIBITOR | 0.1 | 0.58 | 0.1 | 0.58 | 0.1 | 0.69 | 0.1 | 0.69 |
| FN-510 | Shrink Additive A | 1.25 | 7.31 | 1.25 | 7.31 | 1.25 | 8.59 | 1.25 | 8.59 |
| CAST | RELEASE AGENT A | 1.2 | 7.01 | 1.2 | 7.01 | 1.2 | 8.25 | 1.2 | 8.25 |
| Tech-Lube HV-706 | RELEASE AGENT D |  |  |  |  |  |  |  |  |
| ASBURY 4172 | GRAPHITE S |  |  |  |  |  |  | 80 | 549.83 |
| ASBURY 4811 | GRAPHITE T |  |  |  |  |  |  |  |  |
| APPLIED CARBON K-100 | GRAPHITE U | 77 | 450.29 |  |  |  |  |  |  |
| APPLIED CARBON K-112 | GRAPHITE V |  |  | 77 | 450.29 |  |  |  |  |
| ASUBURY 4580 | GRAPHITE W |  |  |  |  |  |  |  |  |
| ASBURY 4012 | GRAPHITE A |  |  |  |  |  |  |  |  |
| ICCI TYROSID 1000 | CONDUCTIVE POLYMER A |  |  |  |  | 80 | 550 |  |  |
| 7263 | Rheological Modifier B | 3.15 | 18.42 | 3.15 | 18.42 | 2.7 | 18.57 | 2.7 | 18.57 |
| Rubinate 1780 | Rheological Modifier D |  |  |  |  |  |  |  |  |
| Silver Coated Cer. Fibers | FIBER G |  |  |  |  |  |  |  |  |
| APPLIED SCIENCE PYROGRAF | FIBER H |  |  |  |  |  |  |  |  |

|  |  | L-24613 % BOT | L-24613 phr | L-24615 % BOT | L-24615 phr | L-24617 % BOT | L-24617 phr | L-24796 % BOT | L-24796 phr |
|---|---|---|---|---|---|---|---|---|---|
| 042-2641 | RESIN D | 14.55 | 100 | 14.55 | 100 | 14.55 | 100 | 17.44 | 100 |
| RCI 31633 (ITP-1094) | RESIN N |  |  |  |  |  |  |  |  |
| DOW SD-780 | RESIN Q |  |  |  |  |  |  |  |  |
| DIVINYLBENZENE (DVB-HP) | Monomer B |  |  |  |  |  |  |  |  |

-continued

| | | | | | | | | |
|---|---|---|---|---|---|---|---|---|
| BPIC 29B75 | INITIATOR B | 0.2 | 1.37 | 0.2 | 1.37 | 0.2 | 1.37 | 0.2 | 1.15 |
| 91029 | INITIATOR U INHIBITOR | 0.1 | 0.69 | 0.1 | 0.69 | 0.1 | 0.69 | 0.1 | 0.57 |
| FN-510 | Shrink Additive A | 1.25 | 8.59 | 1.25 | 8.59 | 1.25 | 8.59 | 0.85 | 4.87 |
| CAST | RELEASE AGENT A | 1.2 | 8.25 | 1.2 | 8.25 | 1.2 | 8.25 | 1.2 | 6.88 |
| Tech-Lube HV-706 | RELEASE AGENT D | | | | | | | | |
| ASBURY 4172 | GRAPHITE S | | | | | | | | |
| ASBURY 4811 | GRAPHITE T | 80 | 549.83 | | | | | | |
| APPLIED CARBON K-100 | GRAPHITE U | | | 80 | 549.83 | | | 77 | 441.51 |
| APPLIED CARBON K-112 | GRAPHITE V | | | | | 80 | 549.83 | | |
| ASUBURY 4580 | GRAPHITE W | | | | | | | | |
| ICCI TYROSID 1000 | CONDUCTIVE POLYMER A | | | | | | | | |
| 7263 | Rheological Modifier B | 2.7 | 18.57 | 2.7 | 18.57 | 2.7 | 18.57 | 3.21 | 18.41 |
| Rubinate 1780 | Rheological Modifier D | | | | | | | | |
| Silver Coated Cer. Fibers | FIBER G | | | | | | | | |
| APPLIED SCIENCE PYROGRAF | FIBER H | | | | | | | | |

| | | L-24803 % BOT | L-24803 phr | L-24903 % BOT | L-24903 phr | L-24990 % BOT | L-24990 phr | L-24993 % BOT | L-24993 phr |
|---|---|---|---|---|---|---|---|---|---|
| 042-2641 | RESIN D | 17.9 | 100 | 19.4 | 100 | 17.9 | 100 | 13.68 | 100 |
| RCI 31633 (ITP-1094) | RESIN N | | | | | | | | |
| DOW SD-780 | RESIN Q | | | | | | | | |
| DIVINYLBENZENE (DVB-HP) | Monomer B | | | | | | | | |
| BPIC 29B75 | INITIATOR B | 0.2 | 1.12 | 0.2 | 1.03 | 0.2 | 1.12 | 0.2 | 1.46 |
| 91029 | INITIATOR D INHIBITOR | 0.1 | 0.56 | 0.1 | 0.52 | 0.1 | 0.57 | 0.1 | 0.73 |
| FN-510 | Shrink Additive A | 0.3 | 1.68 | 0.3 | 1.55 | 0.3 | 1.68 | 0.3 | 2.19 |
| CAST | RELEASE AGENT A | 1.2 | 6.7 | 1.2 | 6.19 | | | 1.2 | 8.77 |
| Tech-Lube HV-706 | RELEASE AGENT D | | | | | 1.2 | 6.7 | | |
| ASBURY 4172 | GRAPHITE S | | | | | | | | |
| ASBURY 4811 | GRAPHITE T | | | | | | | | |
| APPLIED CARBON K-100 | GRAPHITE U | 77 | 430.17 | 75 | 386.6 | 77 | 430.17 | 77 | 562.87 |
| APPLIED CARBON K-112 | GRAPHITE V | | | | | | | | |
| ASUBURY 4580 | GRAPHITE W | | | | | | | | |
| ICCI TYROSID 1000 | CONDUCTIVE POLYMER A | | | | | | | | |
| 7263 | Rheological Modifier B | 3.3 | 18.44 | 3.8 | 19.58 | 3.3 | 18.44 | 2.52 | 18.42 |
| Rubinate 1780 | Rheological Modifier D | | | | | | | | |
| Silver Coated Cer. Fibers | FIBER G | | | | | | | 5 | 36.55 |
| APPLIED SCIENCE PYROGRAF | FIBER H | | | | | | | | |

| | | L-24994 % BOT | L-24994 phr | L-24996 % BOT | L-24996 phr | L-25032 % BOT | L-25032 phr | L-25033 % BOT | L-25033 phr |
|---|---|---|---|---|---|---|---|---|---|
| 042-2641 | RESIN D | 17.9 | 100 | 17.9 | 100 | 15.55 | 100 | 14.01 | 100 |
| RCI 31633 (ITP-1094) | RESIN N | | | | | | | | |
| DOW SD-780 | RESIN Q | | | | | | | | |
| DIVINYLBENZENE (DVB-HP) | Monomer B | | | | | 2.5 | 16.08 | 2.5 | 17.84 |
| BPIC 29B75 | INITIATOR B | 0.2 | 1.12 | 0.2 | 1.12 | 0.2 | 1.29 | 0.2 | 1.43 |
| 91029 | INITIATOR D INHIBITOR | 0.1 | 0.56 | 0.1 | 0.56 | 0.1 | 0.64 | 0.1 | 0.71 |
| FN-510 | Shrink Additive A | 0.3 | 1.68 | 0.3 | 1.68 | 1.25 | 8.04 | 0.3 | 2.14 |
| CAST | RELEASE AGENT A | 1.2 | 6.7 | | | | | | |
| Tech-Lube HV-706 | RELEASE AGENT D | | | 1.2 | 6.7 | 1.2 | 7.72 | 1.2 | 8.57 |
| ASBURY 4172 | GRAPHITE S | | | | | | | | |
| ASBURY 4811 | GRAPHITE T | | | | | | | | |

-continued

| | | | | | | | | |
|---|---|---|---|---|---|---|---|---|
| APPLIED CARBON K-100 | GRAPHITE U | 72 | 402.23 | 72 | 402.23 | 74 | 475.88 | 77 | 549.61 |
| APPLIED CARBON K-112 | GRAPHITE V | | | | | | | | |
| ASUBURY 4580 | GRAPHITE W | | | | | | | | |
| ICCI TYROSID 1000 | CONDUCTIVE POLYMER A | | | | | | | | |
| 7263 | Rheological Modifier B | 3.3 | 18.44 | 3.3 | 18.44 | 5.2 | 33.44 | 4.69 | 33.48 |
| Rubinate 1780 | Rheological Modifier D | | | | | | | | |
| Silver Coated Cer. Fibers | FIBER G | 5 | 27.93 | 5 | 27.93 | | | | |
| APPLIED SCIENCE PYROGRAF | FIBER H | | | | | | | | |

| | | L-25042 % BOT | L-25042 phr | L-25061 % BOT | L-25061 phr | L-25062 % BOT | L-25062 phr | L-25063 % BOT | L-25063 phr |
|---|---|---|---|---|---|---|---|---|---|
| 042-2641 | RESIN D | | | 13.49 | 100 | 12.16 | 100 | 13.09 | 100 |
| RCI 31633 (ITP-1094) | RESIN N | 17.18 | 100 | | | | | | |
| DOW SD-780 | RESIN Q | | | | | | | | |
| DIVINYLBENZENE (DVB-HP) | Monomer B | 2.5 | 14.55 | 2.5 | 18.53 | 2.5 | 20.56 | 2.5 | 19.1 |
| BPIC | INITIATOR B | | | 0.2 | 1.48 | 0.2 | 1.64 | 0.2 | 1.53 |
| 29B75 | INITIATOR D | 0.11 | 0.64 | | | | | | |
| 91029 | INHIBITOR | 0.1 | 0.58 | 0.1 | 0.74 | 0.1 | 0.82 | 0.1 | 0.76 |
| FN-510 | Shrink Additive A | 0.3 | 1.75 | 1.25 | 9.27 | 0.3 | 2.47 | 0.3 | 2.29 |
| CAST | RELEASE AGENT A | | | | | | | | |
| Tech-Lube HV-706 | RELEASE AGENT D | 1.2 | 6.98 | 1.2 | 8.9 | 1.2 | 9.87 | 1.2 | 9.17 |
| ASBURY 4172 | GRAPHITE S | | | | | | | | |
| ASBURY 4811 | GRAPHITE T | | | | | | | | |
| APPLIED CARBON K-100 | GRAPHITE U | 77 | 448.2 | 74 | 548.55 | 77 | 633.22 | 77 | 588.24 |
| APPLIED CARBON K-112 | GRAPHITE V | | | | | | | | |
| ASBURY 4580 | GRAPHITE W | | | | | | | | |
| ICCI TYROSID 1000 | CONDUCTIVE POLYMER A | | | | | | | | |
| 7263 | Rheological Modifier B | | | 7.26 | 53.82 | 6.54 | 53.78 | 5.61 | 42.86 |
| Rubinate 1780 | Rheological Modifier D | 1.61 | 9.37 | | | | | | |
| Silver Coated Cer. Fibers | FIBER G | | | | | | | | |
| APPLIED SCIENCE PYROGRAF | FIBER H | | | | | | | | |

| | | L-25064 % BOT | L-25064 phr | L-25065 % BOT | L-25065 phr | L-25076 % BOT | L-25076 phr | L-25090 % BOT | L-25090 phr |
|---|---|---|---|---|---|---|---|---|---|
| 042-2641 | RESIN D | | | | | | | 15.9 | 100 |
| RCI 31633 (ITP-1094) | RESIN N | 15.97 | 100 | 14.1 | 100 | | | | |
| DOW SD-780 | RESIN Q | | | | | 15.44 | 100 | | |
| DIVINYLBENZENE (DVB-HP) | Monomer B | 2.5 | 15.65 | 2.5 | 17.73 | 2.5 | 16.19 | | |
| BPIC | INITIATOR B | | | | | 0.2 | 1.3 | 0.2 | 1.25 |
| 29B75 | INITIATOR D | 0.11 | 0.68 | 0.11 | 0.78 | | | | |
| 91029 | INHIBITOR | 0.1 | 0.63 | 0.1 | 0.71 | 0.1 | 0.65 | 0.1 | 0.63 |
| FN-510 | Shrink Additive A | 0.3 | 1.88 | 0.3 | 2.13 | 1.25 | 8.1 | 0.3 | 1.69 |
| CAST | RELEASE AGENT A | | | | | | | 1.2 | 7.55 |
| Tech-Lube HV-706 | RELEASE AGENT D | 1.2 | 7.51 | 1.2 | 8.51 | 1.2 | 7.77 | | |
| ASBURY 4172 | GRAPHITE S | | | | | | | | |
| ASBURY 4811 | GRAPHITE T | | | | | | | | |
| APPLIED CARBON K-100 | GRAPHITE U | 77 | 482.15 | 77 | 546.1 | 77 | 498.7 | 77 | 484.27 |
| APPLIED CARBON K-112 | GRAPHITE V | | | | | | | | |
| ASBURY 4580 | GRAPHITE W | | | | | | | | |
| ICCI TYROSID 1000 | CONDUCTIVE POLYMER A | | | | | | | | |

-continued

| | | | | | | | | |
|---|---|---|---|---|---|---|---|---|
| 7263 | Rheological Modifier B | 2.82 | 17.66 | 4.69 | 33.26 | 2.31 | 14.96 | 5.3 | 33.33 |
| Rubinate 1780 | Rheological Modifier D | | | | | | | | |
| Silver Coated Cer. Fibers | FIBER G | | | | | | | | |
| APPLIED SCIENCE PYROGRAF | FIBER H | | | | | | | | |

| | | L-25091 % BOT | L-25091 phr | L-25097 % BOT | L-25097 phr | L-25098 % BOT | L-25098 phr | L-25099 % BOT | L-25099 phr |
|---|---|---|---|---|---|---|---|---|---|
| 042-2641 | RESIN D | 13.65 | 100 | | | | | | |
| RCI 31633 (ITP-1094) | RESIN N | | | 15.03 | 100 | 13.29 | 100 | | |
| DOW SD-780 | RESIN Q | | | | | | | 15.09 | 100 |
| DIVINYLBENZENE (DVB-HP) | Monomer B | | | 2.5 | 16.63 | 2.5 | 18.81 | 2.5 | 16.57 |
| BPIC | INITIATOR B | 0.2 | 1.46 | | | | | 0.2 | 1.33 |
| 29B75 | INITIATOR D | | | 0.11 | 0.73 | 0.11 | 0.75 | | |
| 91029 | INHIBITOR | 0.1 | 0.73 | 0.1 | 0.67 | 0.1 | 0.75 | 0.1 | 0.66 |
| FN-510 | Shrink Additive A | 0.3 | 2.19 | 0.3 | 2 | 0.3 | 2.25 | 1.25 | 8.28 |
| CAST | RELEASE AGENT A | 1.2 | 8.79 | | | | | | |
| Tech-Lube HV-706 | RELEASE AGENT D | | | 1.2 | 7.98 | 1.2 | 9.03 | 1.2 | 7.95 |
| ASBURY 4172 | GRAPHITE S | | | | | | | | |
| ASBURY 4811 | GRAPHITE T | | | | | | | | |
| APPLIED CARBON K-100 | GRAPHITE U | 80 | 586.08 | 77 | 512.31 | 77 | 579.38 | 77 | 510.27 |
| APPLIED CARBON K-112 | GRAPHITE V | | | | | | | | |
| ASUBURY 4580 | GRAPHITE W | | | | | | | | |
| ICCI TYROSID 1000 | CONDUCTIVE POLYMER A | | | | | | | | |
| 7263 | Rheological Modifier B | 4.55 | 33.33 | | | | | 2.66 | 17.63 |
| Rubinate 1780 | Rheological Modifier D | | | 3.76 | 25.02 | 5.5 | 41.38 | | |
| Silver Coated Cer. Fibers | FIBER G | | | | | | | | |
| APPLIED SCIENCE PYROGRAF | FIBER H | | | | | | | | |

| | | L-25100 % BOT | L-25100 phr | L-25111 % BOT | L-25111 phr | L-25136 % BOT | L-25136 phr | L-25147 % BOT | L-25147 phr |
|---|---|---|---|---|---|---|---|---|---|
| 042-2641 | RESIN D | | | 17.9 | 100 | 9.46 | 100 | 19.21 | 100 |
| RCI 31633 (ITP-1094) | RESIN N | | | | | | | | |
| DOW SD-780 | RESIN Q | 14.2 | 100 | | | | | | |
| DIVINYLBENZENE (DVB-HP) | Monomer B | 2.5 | 17.61 | | | | | | |
| BPIC | INITIATOR B | 0.2 | 1.41 | 0.2 | 1.11 | 0.2 | 2.11 | 0.2 | 1.04 |
| 29B75 | INITIATOR D | | | | | | | | |
| 91029 | INHIBITOR | 0.1 | 0.7 | 0.1 | 0.56 | 0.1 | 1.06 | 0.1 | 0.52 |
| FN-510 | Shrink Additive A | 1.25 | 8.8 | 0.3 | 1.68 | 0.3 | 3.17 | 1.25 | 6.51 |
| CAST | RELEASE AGENT A | | | 1.2 | 6.7 | | | 1.2 | 6.25 |
| Tech-Lube HV-706 | RELEASE AGENT D | 1.2 | 8.45 | | | 1.2 | 12.68 | | |
| ASBURY 4172 | GRAPHITE S | | | | | | | | |
| ASBURY 4811 | GRAPHITE T | | | | | | | | |
| APPLIED CARBON K-100 | GRAPHITE U | 77 | 542.25 | | | | | 74 | 385.22 |
| APPLIED CARBON K-112 | GRAPHITE V | | | | | | | | |
| ASUBURY 4580 | GRAPHITE W | | | 77 | 430.17 | 87 | 919.66 | | |
| ICCI TYROSID 1000 | CONDUCTIVE POLYMER A | | | | | | | | |
| 7263 | Rheological Modifier B | 3.55 | 25 | 3.3 | 18.43 | 1.74 | 18.39 | 3.54 | 18.43 |
| Rubinate 1780 | Rheological Modifier D | | | | | | | | |
| Silver Coated Cer. Fibers | FIBER G | | | | | | | | |
| APPLIED SCIENCE PYROGRAF | FIBER H | | | | | | | 0.5 | 2.6 |

-continued

|  |  | L-25148 % BOT | L-25148 phr | L-25149 % BOT | L-25149 phr | L-25150 % BOT | L-25150 phr | L-25151 % BOT | L-25151 phr |
|---|---|---|---|---|---|---|---|---|---|
| 042-2641 | RESIN D | 17.95 | 100 | 16.25 | 100 | 14.56 | 100 | 19.21 | 100 |
| RCI 31633 (ITP-1094) | RESIN N | | | | | | | | |
| DOW SD-780 | RESIN Q | | | | | | | | |
| DIVINYLBENZENE (DVB-HP) | Monomer B | | | | | | | | |
| BPIC | INITIATOR B | 0.2 | 1.11 | 0.2 | 1.23 | 0.2 | 1.37 | 0.2 | 1.04 |
| 29B75 | INITIATOR D | | | | | | | | |
| 91029 | INHIBITOR | 0.1 | 0.56 | 0.1 | 0.62 | 0.1 | 0.69 | 0.1 | 0.52 |
| FN-510 | Shrink Additive A | 1.25 | 6.96 | 1.25 | 7.69 | 1.25 | 8.59 | 1.25 | 6.51 |
| CAST | RELEASE AGENT A | 1.2 | 6.69 | 1.2 | 7.38 | 1.2 | 8.24 | 1.2 | 6.25 |
| Tech-Lube HV-706 | RELEASE AGENT D | | | | | | | | |
| ASBURY 4172 | GRAPHITE S | | | | | | | | |
| ASBURY 4811 | GRAPHITE T | | | | | | | | |
| APPLIED CARBON K-100 | GRAPHITE U | 74 | 412.26 | 74 | 455.38 | 74 | 508.24 | 74 | 385.22 |
| APPLIED CARBON K-112 | GRAPHITE V | | | | | | | | |
| ASUBURY 4580 | GRAPHITE W | | | | | | | | |
| ICCI TYROSID 1000 | CONDUCTIVE POLYMER A | | | | | | | 0.5 | 2.6 |
| 7263 | Rheological Modifier B | 3.3 | 18.38 | 3 | 18.46 | 2.69 | 18.48 | 3.54 | 18.43 |
| Rubinate 1780 | Rheological Modifier D | | | | | | | | |
| Silver Coated Cer. Fibers | FIBER G | | | | | | | | |
| APPLIED SCIENCE PYROGRAF | FIBER H | 2 | 11.14 | 4 | 24.62 | 6 | 41.21 | | |

|  |  | L-25152 % BOT | L-25152 phr | L-25153 % BOT | L-25153 phr | L-25154 % BOT | L-25154 phr |
|---|---|---|---|---|---|---|---|
| 042-2641 | RESIN D | 17.95 | 100 | 16.25 | 100 | 14.56 | 100 |
| RCI 31633 (ITP-1094) | RESIN N | | | | | | |
| DOW SD-780 | RESIN Q | | | | | | |
| DIVINYLBENZENE (DVB-HP) | Monomer B | | | | | | |
| BPIC | INITIATOR B | 0.2 | 1.11 | 0.2 | 1.23 | 0.2 | 1.37 |
| 26B75 | INITIATOR C | | | | | | |
| 91029 | INHIBITOR | 0.1 | 0.56 | 0.1 | 0.62 | 0.1 | 0.69 |
| FN-510 | Shrink Additive A | 1.25 | 6.96 | 1.25 | 7.69 | 1.25 | 8.59 |
| CAST | RELEASE AGENT A | 1.2 | 6.69 | 1.2 | 7.38 | 1.2 | 8.24 |
| Tech-Lube HV-706 | RELEASE AGENT D | | | | | | |
| ASBURY 4172 | GRAPHITE S | | | | | | |
| ASBURY 4811 | GRAPHITE T | | | | | | |
| APPLIED CARBON K-100 | GRAPHITE U | 74 | 412.26 | 74 | 455.38 | 74 | 508.24 |
| APPLIED CARBON K-112 | GRAPHITE V | | | | | | |
| ASUBURY 4580 | GRAPHITE W | | | | | | |
| ICCI TYROSID 1000 | CONDUCTIVE POLYMER A | 2 | 11.14 | 4 | 24.62 | 6 | 41.21 |
| 7263 | Rheological Modifier B | 3.3 | 18.38 | 3 | 18.46 | 2.69 | 18.48 |
| Rubinate 1780 | Rheological Modifier D | | | | | | |
| Silver Coated Cer. Fibers | FIBER G | | | | | | |
| APPLIED SCIENCE PYROGRAF | FIBER H | | | | | | |

What is claimed is:

1. A conductive molding composition comprising;
    a) an unsaturated prepolymer resin which comprises one or more of unsaturated polyester and vinyl ester resin;
    b) an unsaturated material copolymerizable with said resin and including a terminal ethylene group;
    c) a particulate conductive filler having at least 50% particles larger than 200 microns in an amount sufficient to provide a bulk conductivity of at least 70 S/cm to the resulting product; and
    d) an initiator to initiate said copolymerization.

2. A composition as set forth in claim 1 wherein the amount of said conductive filler is at least 50 weight percent.

3. A composition as set forth in claim 2 wherein the filler is a graphite filler and the amount of said conductive filler is at least 60 weight percent.

4. A composition as set forth in claim 1 wherein the composition further comprises an effective amount of a rheological modifier to prevent phase separation between said resin and said conductive filler during molding, said rheological modifier being one or more compositions selected from the group consisting of Group II oxides and hydroxides, carbodiamides, aziridines, polyisocyanates, polytetrafluorethylene, perfluoropolyether, polyethylene and famed silica.

5. A composition as set forth in claim 4 wherein said composition is molded into a product which has an intricate pattern molded therein and has a thickness from about 0.050 to about 0.200 inches.

6. A composition as set forth in claim 5 wherein said product is an electrochemical cell flow field plate.

7. A composition as set forth in claim 6 wherein said conductive filler comprises a crystalline graphite particle and, and said unsaturated prepolymer resin is one or more resins selected from the group consisting of epoxy vinyl resin, bisphenol fumarate resin, modified bisphenol fumarate polyester resin, unsaturated polyester resin, urethane modified vinyl ester resin, bisphenol-epoxy vinyl ester resin, elastomer-modified vinyl ester resin, epoxy novolac vinyl ester resin and unsaturated isocyanurate vinyl ester resin.

8. A fuel cell flow plate comprising;
   a) an unsaturated prepolymer resin which comprises one or more of unsaturated polyester and vinyl ester resin;
   b) an unsaturated material copolymerizable with said resin and including a terminal ethylene group;
   c) a particulate conductive filler having at least 50% particles larger than 200 microns in an amount sufficient to provide a bulk conductivity of at least 70 S/cm to the resulting product; and
   d) an initiator to initiate said copolymerization.

9. A fuel cell flow plate as set forth in claim 8 wherein the amount of said conductive filler is at least 50 weight percent.

10. A fuel cell flow plate as set forth in claim 9 wherein the filler is a graphite filler and the amount of said conductive filler is at least 60 weight percent.

11. A fuel cell flow plate as set forth in claim 8 wherein the composition further comprises an effective amount of a rheological modifier to prevent phase separation between said resin and said conductive filler during molding, said rheological modifier being one or more compositions selected from the group consisting of Group II oxides and hydroxides, carbodiamides, aziridines, polyisocyanates, polytetrafluorethylene, perfluoropolyether, polyethylene and fumed silica.

12. A fuel cell flow plate as set forth in claim 8 wherein said conductive filler has at least 10% particles larger than 300 microns.

13. A fuel cell flow plate as set forth in claim 12 wherein said conductive filler has at least 25% particles larger than 300 microns.

14. A fuel cell flow plate as set forth in claim 8 wherein said conductive filler comprises a crystalline graphite particle and, and said unsaturated prepolymer resin is one or more resins selected from the group consisting of epoxy vinyl resin, bisphenol fumarate resin, modified bisphenol fumarate polyester resin, unsaturated polyester resin, urethane modified vinyl ester resin, bisphenol-epoxy vinyl ester resin, elastomer-modified vinyl ester resin, epoxy novolac vinyl ester resin and unsaturated isocyanurate vinyl ester resin.

15. A method for making a conductive product comprising the steps of mixing;
   a) an unsaturated prepolymer resin which comprises one or more of unsaturated polyester and vinyl ester resin;
   b) an unsaturated material copolymerizable with said resin and including a terminal ethylene group;
   c) a particulate conductive filler having at least 50% particles larger than 200 microns in an amount sufficient to provide a bulk conductivity of at least 70 S/cm to the resulting product;
   d) an initiator to initiate said copolymerization and molding said composition to form said product.

16. A method as set forth in claim 15 wherein the amount of said conductive filler is at least 50 weight percent.

17. A method as set forth in claim 16 wherein the filler is a graphic filler and the amount of said conductive filler is at least 60 weight percent.

18. A method as set forth in claim 15 wherein the composition further comprises an effective amount of a rheological modifier to prevent phase separation between said resin and said conductive filler during molding, said rheological modifier being one or more compositions selected from the group consisting of Group II oxides and hydroxides, carbodiamides, aziridines, polyisocyanates, polytetrafluorethylene, perfluoropolyether, polyethylene and fumed silica.

19. A method as set forth in claim 15 wherein said composition is molded into a product which has an intricate pattern molded therein and has a thickness from about 0.050 to about 0.200 inches.

20. A method as set forth in claim 15 wherein said molding step comprises compression, injection, or compression/injection molding.

* * * * *